United States Patent Office 2,840,579
Patented June 24, 1958

2,840,579

9α-HYDROXY-6-OXYGENATED PROGESTERONES

David Perlman, Princeton, and James D. Dutcher and Josef Fried, New Brunswick, N. J., and Elwood O. Titus, Kensington, Md., assignors to Olin Mathieson Chemical Corporation, New York, N. Y., a corporation of Virginia No Drawing. Application May 24, 1957
Serial No. 661,308

5 Claims. (Cl. 260—397.45)

This application is a continuation-in-part of our parent application Serial No. 283,122, filed April 18, 1952, now abandoned.

This invention relates to, and has for its object, the provision of 6-oxygenated 9α-hydroxyprogesterones, steroids of the general formula

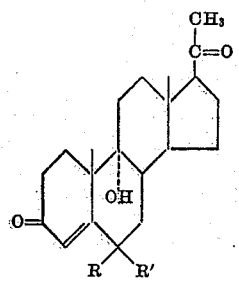

wherein R is hydrogen, R' is β-hydroxy or β-acyloxy (particularly the acyloxy radicals of hydrocarbon carboxylic acids having less than ten carbon atoms), or together R and R' is oxygen.

The steroids of this invention are physiologically active substances which possess both glucocorticoid and progestational activity. Hence they can be used, for example, in lieu of progesterone in the treatment of functional uterine bleeding, for which purpose they are administered in the same manner as progesterone with dosage adjusted for the relative activity of the particular steroid.

6β,9α-dihydroxyprogresterone is prepared by subjecting progesterone to the action of enzyme of the microorganism *Streptomyces aureofaciens* under oxidizing conditions. The oxidation can best be effected by either including the steroid in the aerobic culture of the microorganism, or by bringing together in an aqueous medium the steroid, air and enzymes of non-proliferating cells of the microorganism.

In general, the conditions of culturing *Streptomyces aureofaciens* for the purposes of this invention are (except for the inclusion of the steroid to be converted) the same as those of culturing various other Streptomyces for the production of antibiotics and/or vitamin $B_{12}$, i. e., the microorganism is aerobically grown in contact with (in or on a suitable fermentation medium. A suitable medium essentially comprises a source of carbon and energy. The latter may be a carbohydrate (such as sucrose, molasses, glucose, maltose, starch or dextrin), a fatty acid, a fat (such as soybean oil) and/or the steroid itself. Preferably, however, the medium includes an assimilable source of carbon and energy in addition to the steroid.

The source of nitrogenous factors may be organic (e. g., soybean meal, corn steep liquor, meat extract and/or distillers solubles) or synthetic (i. e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred range of concentration of the steroid in the culture is about 0.01 to 0.10%. The culture period may vary considerably, the range of about 6 to 96 hours being feasible, but not limiting.

The process yields, inter alia, 6β,9α-dihydroxyprogesterone, which can, if desired, be oxidized in the usual manner (e. g., by treatment with chromic acid) to yield 9α-hydroxy-6-ketoprogesterone, or esterified by treatment with the desired acid anhydride or acyl halide in an organic solvent (preferably an organic base such as pyridine) to yield the corresponding 6β-acyloxy-9α-hydroxyprogesterone. The preferred acylating agents are those of hydrocarbon carboxylic acids of less than ten carbon atoms, as exemplified by the acid anhydrides or acyl chlorides of the lower alkanoic acids (e. g., acetic, propionic and enanthic acid), the monocyclic aromatic carboxylic acids (e. g., benzoic and o, m, or p-toluic acid), the monocyclic aralkanoic acids (e. g., α-toluic and β-phenylpropionic acid), the lower alkenoic acids, the lower cycloalkane carboxylic acids and the lower cycloalkene carboxylic acids.

The following examples illustrate the process of this invention:

EXAMPLE 1

6β,9α-dihydroxyprogesterone

(a) FERMENTATION

An aqueous medium of the following composition is prepared:

| | |
|---|---|
| Glycine | g__ 2.6 |
| Sodium acid glutamate | g__ 2.2 |
| Soybean oil | g__ 2.2 |
| $K_2HPO_4 \cdot 3H_2O$ | g__ 0.5 |
| $MgSO_4 \cdot 7H_2O$ | g__ 0.5 |
| $FeSO_4 \cdot 7H_2O$ | g__ 0.025 |
| $ZnSO_4 \cdot 7H_2O$ | g__ 0.03 |
| $Co(NO_3)_2 \cdot 6H_2O$ | g__ 0.005 |
| $CuSO_4 \cdot 5H_2O$ | g__ 0.016 |
| $MnSO_4 \cdot 4H_2O$ | g__ 0.012 |
| $CaCl_2 \cdot 2H_2O$ | g__ 0.05 |
| Progesterone | g__ 0.2 |
| Water | liter__ 1 |

One hundred-milliliter portions of the medium are distributed into 280 500-ml. Erlenmeyer flasks, and the flasks are plugged with cotton and sterilized in the usual manner (by autoclaving). When cool, each of the flasks is inoculated with 3 ml. of a vegetative inoculum of *Streptomyces aureofaciens* NRRL 2209 which has been grown for 48 hours on a soybean meal-glucose medium. The flasks are then placed on a reciprocating shaker (120 four-inch cycles per minute), and agitation as well as aeration is allowed to proceed at 24–25° C. for five days. The contents of the flasks are pooled and, after the pH of the whole culture is adjusted to 3–4 with $H_2SO_4$, the solids are removed by centrifugation.

(b) ISOLATION

The aqueous fraction is then extracted with 4 5-liter portions of chloroform. The chloroform is removed by anol and extracted seven times with equal volumes (200 oxidation products (usually containing some lipid material and unoxidized steroid from the culture medium as impurities).

The residue of oxidized steroids amounting to about 4.8 grams is dissolved in 200 ml. of 80% aqueous methanol and extracted seve ntimes with equal volumes (200 ml.) of hexane. The methanol solution remaining is concentrated in vacuo to a volume of 50 ml., then extracted three times with 200-ml. portions of chloroform. This chloroform extract is then evaporated to dryness in vacuo and dissolved in 25 ml. of chloroform+25 ml. of benzene. The resulting solution is chromatographed over a 200-g. column of silica gel (Davison No. 923). Eluates of the adsorbed materials are obtained as indicated below:

| Eluate | Total vol. (ml.) | Total dry wt. (mg.) | Component |
|---|---|---|---|
| Benzene-chloroform, 1:2 | 5,400 | 1,118 | Progesterone. |
| Chloroform | 14,200 | 1,289 | 6β-Hydroxyprogesterone +9α-hydroxyprogesterone. |
| Acetone-chloroform, 1:1 | 1,650 | 822 | 6β,9α-Dihydroxyprogesterone. |
| Acetone-chloroform, 1:9 | 21,000 | 346 | Amorphous. |

6β,9α-dihdroxyprogesterone has a melting point of about 208–211° C., $[\alpha]_D^{23}+79°$ (chloroform)

$\lambda_{max}^{alc.} 235\ m\mu(\epsilon=12,500)$

The substance gives a green fluorescence with concentrated surfuric acid.

EXAMPLE 2

*9α-hydroxy-6-ketoprogesterone*

Oxidation of 6β,9α-dihydroxyprogesterone with chromic acid yields 9α-hydroxy-6-ketoprogesterone, M. P. about 200–201°; $[\alpha]_D^{23}-11°$ (c., 0.53 in chloroform)

$\lambda_{max}^{alc.} 255\ m\mu(\epsilon=11,000)$

EXAMPLE 3

*6β,9α-dihydroxyprogesterone acetate*

Treatment of 6β,9α-dihydroxyprogesterone with acetic anhydride in pyridine yields 6β,9α-dihydroxyprogesterone monoacetate, M. P. about 198–199° C.; $[\alpha]_D^{23}+81°$ (chloroform)

$\lambda_{max}^{alc.} 232\ m\mu(\epsilon=13,200)$ which is stable towards chromic acid.

Similarly by substituting other acid anhydrides such as propionic anhydride, or acyl chlorides such as benzoyl chloride, for the acetic anhydride in the procedure of Example 3, the corresponding esters are formed.

The invention may be otherwise variously embodied within the scope of the appended claims.

What is claimed is:

1. A steroid of the general formula

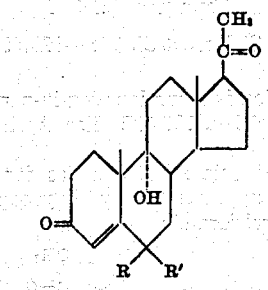

wherein R is hydrogen, R' is selected from the group consisting of β-hydroxy and the β-acyloxy radical of a hydrocarbon carboxylic acid of less than ten carbon atoms, and together R and R' is oxygen.

2. 6β,9α-dihydroxyprogesterone.
3. 9α-hydroxy-6-ketoprogesterone.
4. The 6β-monoester of 6β,9α-dihydroxyprogesterone and a hydrocarbon carboxylic acid of less than ten carbon atoms.
5. 6β,9α-dihydroxyprogesterone 6β-acetate.

References Cited in the file of this patent

UNITED STATES PATENTS 2,595,596   Moffett _____ May 6, 1952

UNITED STATES PATENT OFFICE
CERTIFICATE OF CORRECTION

Patent No. 2,840,579                                                                June 24, 1958

David Perlman et al.

It is hereby certified that error appears in the printed specificatio of the above numbered patent requiring correction and that the said Letter Patent should read as corrected below.

Column 2, line 64, strike out "anol and extracted seven times with equal volumes (200" and insert instead -- evaporation under vacuum, leaving a residue of the solid --; line 69, for "anol and extracted seve ntimes with equal volumes (200" read -- anol and extracted seven times with equal volumes (200 --.

Signed and sealed this 26th day of August 1958.

(SEAL)

Attest:

KARL H. AXLINE                                                         ROBERT C. WATSON

Attesting Officer                                             Commissioner of Patent